(No Model.) 4 Sheets—Sheet 2.
J. C. RUBY.
MACHINE FOR MOLDING CONFECTIONS, &c.
No. 451,523. Patented May 5, 1891.
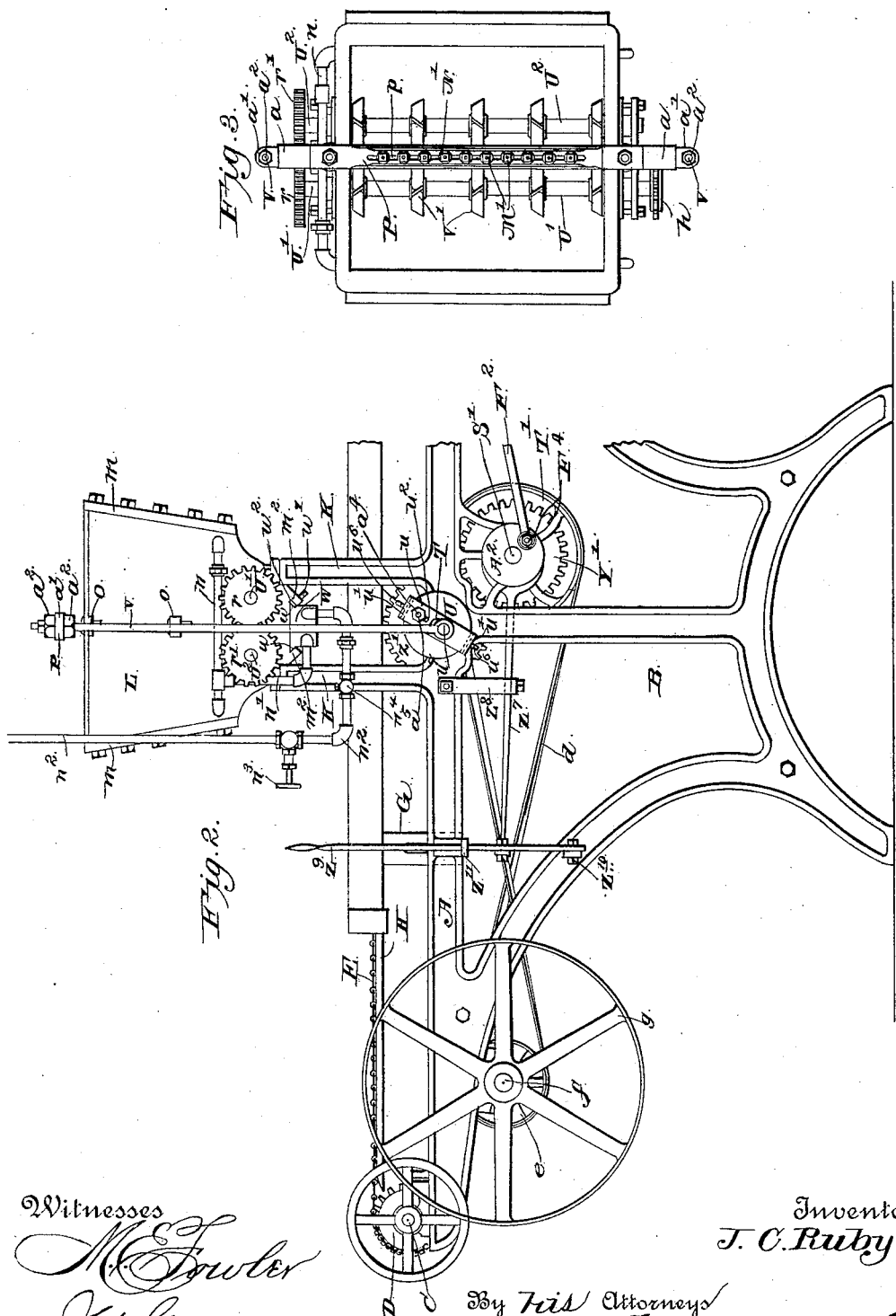
Witnesses
M. E. Fowler
J. W. Garner
Inventor
J. C. Ruby
By his Attorneys
C. A. Knowles (No Model.) 4 Sheets—Sheet 3.

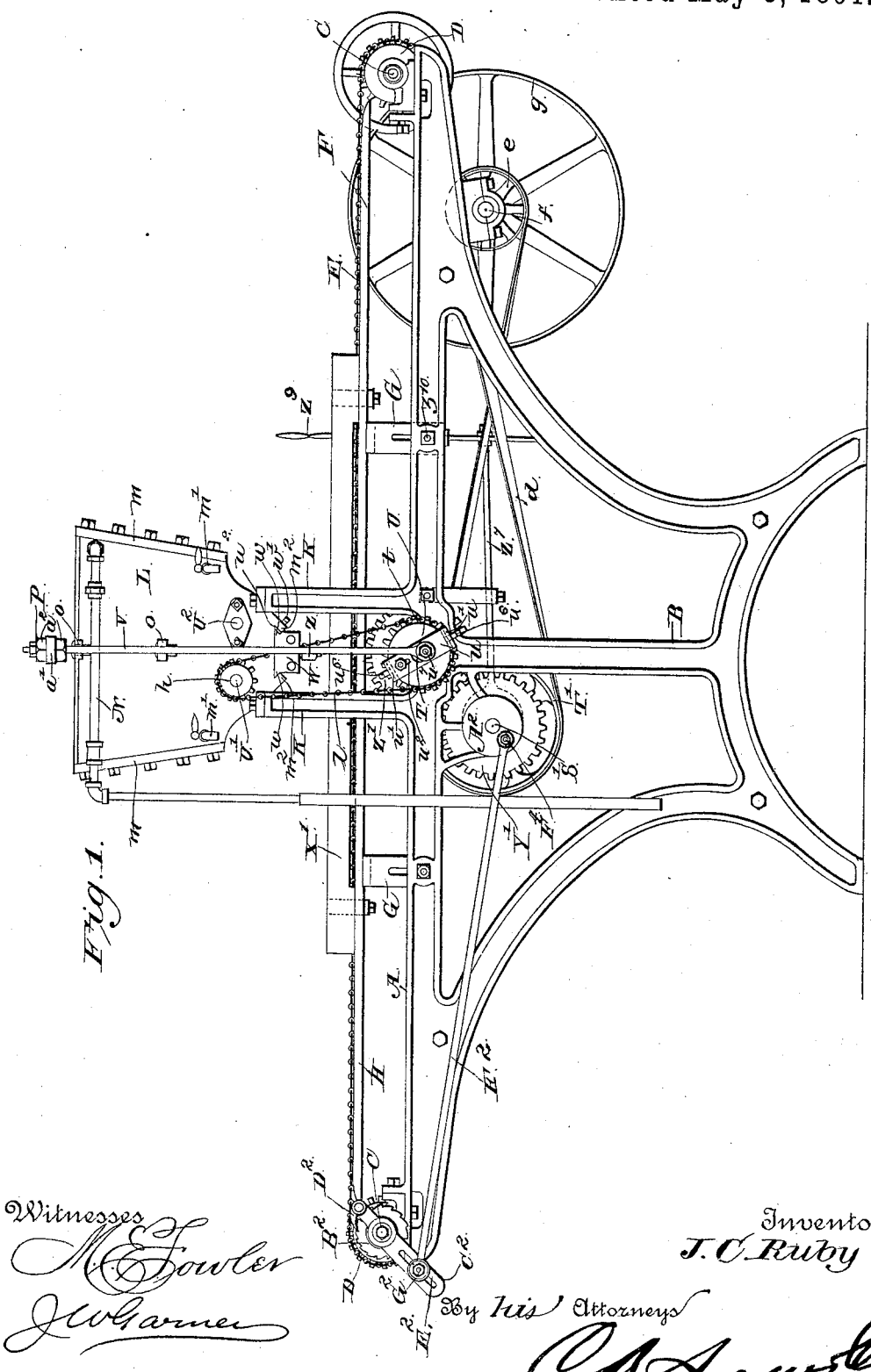

J. C. RUBY.
MACHINE FOR MOLDING CONFECTIONS, &c.

No. 451,523. Patented May 5, 1891.

Witnesses  
M. E. Fowler  
J. W. Garnier

Inventor  
J. C. Ruby  
By his Attorneys (No Model.) 4 Sheets—Sheet 4.
J. C. RUBY.
MACHINE FOR MOLDING CONFECTIONS, &c.
No. 451,523. Patented May 5, 1891.
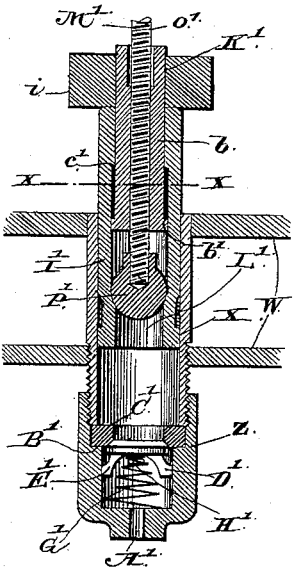
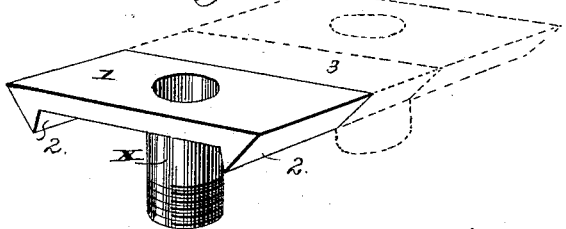
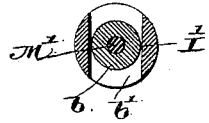
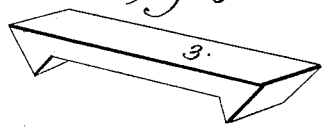
Witnesses
M. Fowler
J.W. Garner
Inventor
J. C. Ruby
By his Attorneys
C. A. Snowsley

UNITED STATES PATENT OFFICE.

JOSHUA CLAY RUBY, OF PHILADELPHIA, PENNSYLVANIA.

MACHINE FOR MOLDING CONFECTIONS, &c.

SPECIFICATION forming part of Letters Patent No. 451,523, dated May 5, 1891.

Application filed March 8, 1889. Serial No. 302,428. (No model.)

*To all whom it may concern:*

Be it known that I, JOSHUA CLAY RUBY, a citizen of the United States, residing at Philadelphia, in the county of Philadelphia and State of Pennsylvania, have invented a new and useful Improvement in Machines for Molding Confections and other Semi-Fluid Materials, of which the following is a specification.

My invention relates to an improvement in machines for molding confections, such as bonbons, marshmallows, gum-drops, and fluid confections and other semi-fluid material; and it consists in the peculiar construction and combination of devices that will be more fully set forth hereinafter, and particularly pointed out in the claims.

This invention is an improvement on the machine described in Letters Patent of the United States No. 393,665, which were granted to me November 27, 1888.

Figure 4:
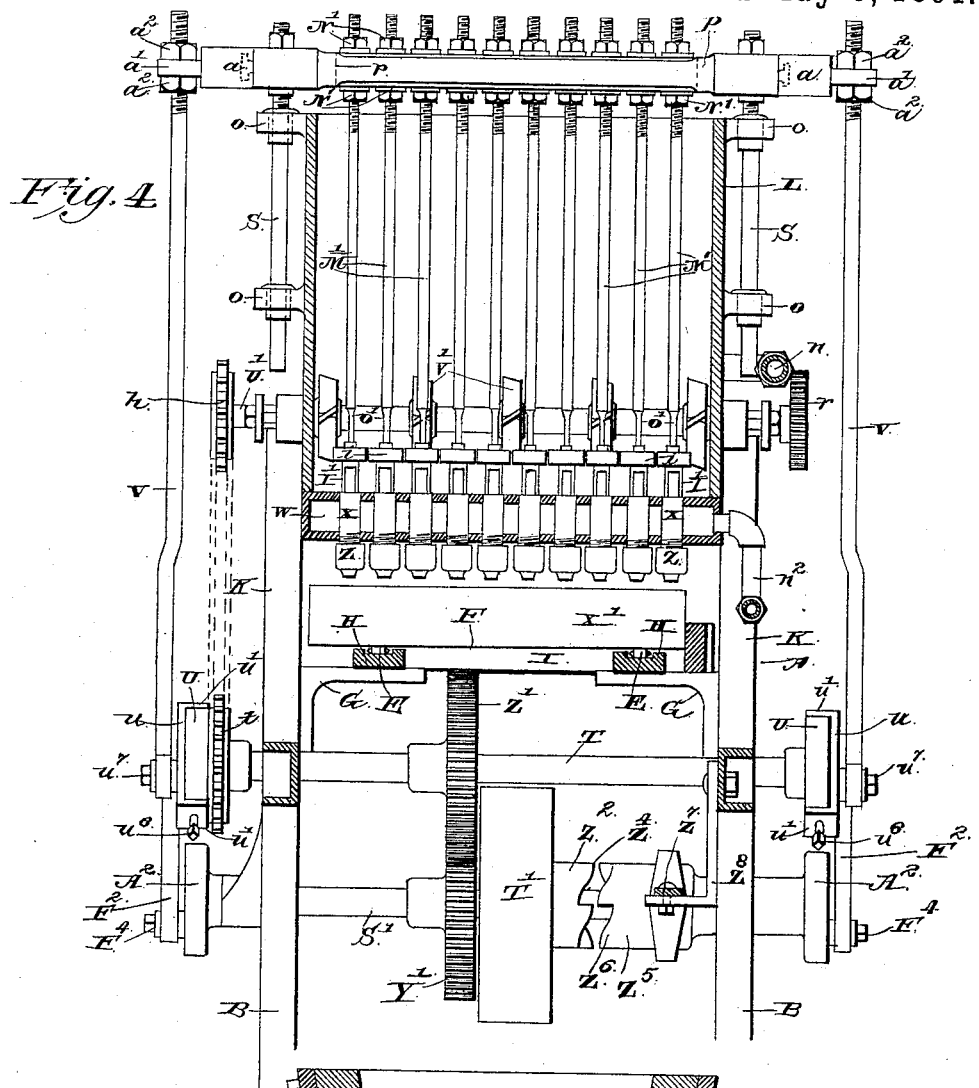
Figure 5:
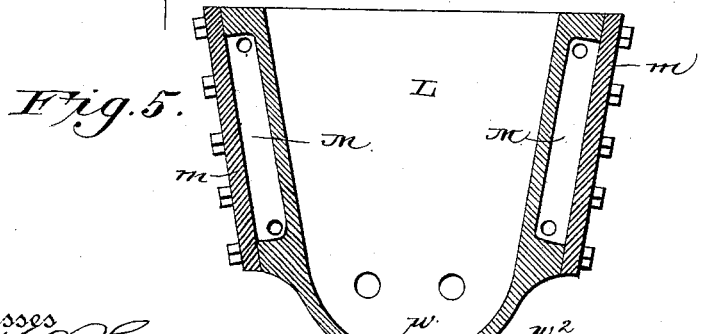

In the accompanying drawings, Figure 1 is a side elevation of a confection-molding machine embodying my improvements. Fig. 2 is a partial elevation of the opposite side thereof. Fig. 3 is a top plan view of the hopper and the mechanism therein. Fig. 4 is a vertical transverse sectional view taken through the center of the hopper. Fig. 5 is a detailed sectional view through the hopper, taken on a plane at right angles to Fig. 4. Fig. 6 is an enlarged detailed sectional view of one of the plungers and molding-cups. Fig. 7 is a detailed perspective view of a modified form of bottom block for the hopper. Fig. 8 is a similar view of a space-block. Fig. 9 is a sectional view taken on the line $x$ $x$ of Fig. 6.

A represents a rectangular frame, which is supported by vertical legs B. Near opposite ends of the frame A are journaled transverse shafts C, each of which is provided with a pair of sprocket-wheels D.

E represents a pair of endless chains which connect the sprocket-wheels on one shaft to the sprocket-wheels on the opposite shaft, the said chains thereby extending nearly throughout the entire length of the frame A, as shown.

F represents a table-frame, which is supported at a suitable height above the frame A by means of brackets or arms G. The said frame F is composed of a pair of side bars H and a series of cross-bars I, which connect the said side bars.

K represents pairs of standards which are arranged on opposite sides of the frame A at or near the center of the same and extend for a suitable distance above the frame. The said standards, together with the sides of the frame A and the supporting-legs B, are cast integrally, as shown. To these standards is secured a hopper L, which is provided on its sides with peripheral flanges, forming water-compartments M, the outer sides of which are formed by plates $m$, which are bolted to the flanges of the hopper and can be removed when it is desired to clean the compartments or have access thereto for any reason.

N represents a water-pipe which communicates with the upper side of the water-compartments M, and serves to maintain a constant circulation of hot water in the said compartment, to the end that the contents of the hopper may be kept hot and in a fluid or semi-fluid condition. On the ends of the hopper are guiding ears or lugs O.

$m'$ represents faucets which are screwed into one end of the hopper and communicate with the lower side of the chambers M. The lower side of the hopper is open and is provided with a pair of downward-converging longitudinal flanges $m^2$. A closed chamber W is provided at its upper edges with beveled outward-extending flanges $w$, which engage the upper side of the flanges $m^2$, and thereby the said chamber W is adapted to be slid into and secured in the opening in the lower side of the hopper and to form the bottom thereof. The said chamber W is maintained in position in the lower side of the hopper by set-screws $w'$, which work in openings in one of the flanges $m^2$ and engage a gib $w^2$, which bears against one of the flanges $w$, as shown. The water-chambers M are placed in communication with each other by means of a pipe $n$, and from the latter depends a pipe $n'$, which communicates with the chamber W. A steam-pipe $n^2$ communicates also with the chamber W, and is provided with a cut-off valve $n^3$, and has a check-valve $n^4$.

P represents a cross-head which is arranged across and above the upper side of the hopper, has its ends projecting beyond the ends of the hopper, and is provided with a pair of vertical depending guide-rods S, which work in vertical openings in the lugs O. The said cross-head is provided with a longitudinal slot p.

In the sides of the frame A, midway between the standards K, is journaled a transverse shaft T, to one end of which is secured a sprocket-wheel t. The said shaft is provided at its ends with crank-wheels U. On the outer side of each of the crank-wheels U is arranged a yoke u, the said yokes having right-angled arms u' at their ends, arranged transversely on diametrically-opposite sides of the peripheral faces of the crank-wheels, and said yokes are further provided with slots $u^2$, extending in the direction of their length. Clamping-bolts $a^4$ project from the outer side of the crank-wheels, extend through the slots $u^2$, and are provided at their outer ends with clamping-nuts $a^5$, which serve to secure the yokes on the crank-wheels, as will be readily understood. Adjusting-screws $u^6$ work in threaded openings in the yoke-arms u', bear against the peripheries of the crank-wheels, and serve to permit the yokes to be shifted to any desired adjustment, so as to increase or decrease the "throw" of the crank-pins $u^7$, which project from the said yokes.

To the ends of the cross-head P are swiveled blocks a, which have ears a' formed at their outer ends.

V represents pitmen, which have their lower ends connected to the crank-pins $u^7$ and have their upper ends extended through openings in the ears a' and secured thereto, and thereby connected to the cross-head at any desired adjustment by means of clamping-nuts $a^2$, which engage the threaded upper ends of the pitmen and bear on the upper and lower sides of the ears a', whereby when the shaft T rotates the crank-wheels, yokes, and pitmen communicate vertical reciprocating motion to the cross-head, as will be very readily understood.

X represents a series of short cylindrical tubes which extend through vertical openings in the bottom of the hopper, or, more properly, in the closed chamber W, the lower ends of the said tubes extending below the bottom of the said chamber and being provided with screw-threads and the upper ends thereof being flush with the upper side of the said chamber. To the lower end of each tube is screwed a cup Z, having a reduced discharge-opening A' at its lower end, and the said cups are each provided with a shoulder B' at a slight distance below the lower end of tube X, and on the said shoulders are supported annular plates C', having central openings which form the seats for valves D'. The said valves have studs or arms E' extending from their lower sides, arranged radially and bearing against the vertical recesses in the cups Z.

G' represents coiled volute springs, which are made of fine steel wire and bear between the bottoms of cups Z and the lower sides of the valves D', the upper ends of the said springs being engaged by screws H', which are secured in the centers of the valve-disks.

In each tube X is fitted a vertical cylindrical plunger I', having openings in its sides, as shown in Fig. 6, the said plungers having their upper ends closed and being provided with squared heads i, in which are central reduced openings K'. The lower ends of the bores in the plungers are reduced in diameter to form seats L'.

M' represents a series of vertical plunger-rods, which have their upper ends extended through the slots p of the cross-head and are secured to the said cross-head by clamping-nuts N', which bear against the upper and lower sides thereof, and thereby admit of vertical adjustment of the said plunger-rods. The lower ends of the said plunger-rods are reduced in diameter for a suitable length to form threaded spindles O', which extend through vertically-movable sleeves b, which are arranged in the openings K' and have shoulders b' at their lower ends adapted to engage shoulders c' in the said openings, and thereby limit the upward movement of the said sleeves. Upon the lower ends of the spindles O' are screwed spherical valves P'.

It will be observed by reference to Fig. 6 that the length of the spindles O' is somewhat in excess of the length of the space between the upper and lower ends of the plungers I', and thereby lost motion of the rods M' is permitted in the plungers. The threaded portions of the plunger-rods engage threaded bores in the sleeves b, and thereby the said sleeves constitute adjusting-nuts which may be turned and caused to move upward or downward on the stems and serve as stops to engage the upper ends of the plungers on the upstrokes of the rods, so as to regulate or limit the lost motion of the rods in the plungers, which causes each plunger to feed an even or uneven amount to suit the molds.

S' represents a driving-shaft which is journaled in the frame A and provided with a driving-pulley T', the same being connected by a crossed endless belt d to a pulley e on a counter-shaft f. The said counter-shaft is provided with a large driving-pulley g, adapted to be connected by an endless belt to a steam-engine or other motor. The said shaft S' is connected to the shaft T by means of gear-wheels Y' and Z'.

U' $U^2$ represent a pair of shafts which extend through the hopper and have their bearings in the ends thereof. The said shafts are provided with radial stirring-paddles V', which are arranged obliquely, as shown in Fig. 3, with the paddles of one shaft registering with the paddles of the other shaft, both sets of paddles working in the spaces between the plungers, and thus serving to keep the contents of the hopper agitated, and also serving to force the contents of the hopper into the tubes X, as will be presently described. One end of the shaft U' is provided with a sprocket-wheel $h$, which is connected to the sprocket-wheel $t$ by means of an endless sprocket-chain $l$. The opposite ends of the shafts U' U² are provided with meshed gear-wheels $r$ $r'$, respectively, as shown in Figs. 2 and 3, the function of these wheels being to impart rotary motion to the shaft U² from the shaft U', as will be understood.

X' represents a tray which is secured to and connects the endless chains E. The said chains and the shafts C and sprocket-wheels D constitute a carrier which is adapted to move the tray longitudinally under the hopper. The said tray is divided into compartments of suitable size, as shown and as described in my before-mentioned Letters Patent of the United States, which compartments are arranged in line with each other, and each series of the said compartments is adapted to register with the cups Z on the under side of the hopper in succession as the tray passes under the said hopper, the motion of the carrier being so regulated that on each upstroke of the cross-head the tray will move a sufficient distance to bring another series of the compartments under the cups Z. On each end of the driving-shaft S' is a crank-wheel A².

B² represents a ratchet-wheel, which may be duplicated at the other side, and each wheel is secured rigidly near one end of one of the shafts C. On the projecting end of the said shaft is loosely mounted a rocking lever C², which has a pawl D², pivoted at its upper end and engaging the ratchet-wheel. Said rocking lever has a slot E² in its lower end.

F² represents a pitman, which is connected to the crank of the wheel A² by a pin or bolt F⁴, and it is also connected to the rocking lever by a bolt G², that may be set in the slot, and thereby enables the pitman to be so adjusted as to regulate the throw of the rocking lever.

From the foregoing it will be understood that when the driving-shaft rotates, motion will be communicated to the shaft T, and thereby cause the cross-head and the plungers to reciprocate. The pitman communicates rocking motion to the lever C² and causes the pawl to partly turn the ratchet-wheel at each forward movement of the lever, giving an intermittent rotary motion to shaft C, and thereby moving the endless carrier and the tray thereon a suitable distance. The table supports the tray, but the latter being connected with the chains is moved along by the motion thereof. As the shaft C is given an intermittent rotary movement the chains will be given a horizontal intermittent longitudinal movement, and since the tray is connected to the chains the same intermittent movement will be imparted to the tray.

The driving-pulley T' and gear-wheel Y' are loose on the shaft S' and are rigidly connected together, and are thereby adapted to rotate in unison. The said pulley T' is provided on one side with a hub Z², which has clutch-teeth Z⁴.

Z⁵ represents a clutch-sleeve which is feathered on the shaft S', and is provided with clutch-teeth Z⁶, which are adapted to engage the clutch-teeth Z⁴. A lever Z⁷ is fulcrumed on the bracket Z⁸, which is secured to one side of the frame A, and one end of the said lever is bifurcated and caused to engage the clutch-sleeve in the usual well-known manner. The opposite end of the said lever is connected to a vertical hand-lever Z⁹, which is pivotally connected to one side of the frame A by a bolt Z¹⁰, and is guided in a slotted bracket Z¹¹.

By means of the mechanism just described the pulley T' may be thrown into or out of connection with the shaft S', and hence the machine may be instantaneously started or stopped at the will of the operator.

The operation of my invention is as follows: On each upstroke of the cross-head the rods M' are elevated, so as to first raise the valves P' from the openings L' and then raise the plungers I' in the tube X. A portion of the fluid or semi-fluid contents of the hopper then flows through the side openings in each plunger and through the opening L' in the lower end thereof into the tube X upon the upper side of the valve D'. On the ensuing downstroke of the cross-head the rods M' are lowered, which first causes the valves P' to close the openings L' in the lower ends of the plungers, and the shoulders at the lower ends of the sleeve-nuts $b$ then engage the upper sides of the valves P', force the same downward in the seats or openings L', and cause the plungers I' to move downward in the tubes X, thereby exerting pressure on the mixture in the tubes X and causing the same to open the valves D' against the resiliency of the springs G' and force the mixture into the cups Z, from which it escapes through the openings A' into the tray. By adjusting the yokes $u$ on the crank-wheels U the stroke of the cross-head may be regulated, and by adjusting the sleeve-nuts $b$ up or down on the stems O' the quantity of material fed to each cup at each upstroke of the cross-head may be regulated, as will be very readily understood, and thereby cause the machine to deposit the mixture in the mold or receptacles of the tray in exactly the desired quantities.

As before described, and illustrated in Figs. 4 and 5, the chamber W closes the open bottom of the hopper and is detachably secured thereto. Hence the said chamber may be readily removed from the hopper and another chamber substituted therefor having a greater or less number of tubes or tubes of greater or less diameter. Thus the quantity and size of the confections can be regulated to suit the taste and fancy of the manufacturer. It will be understood that in removing the chamber from the hopper it is necessary to separate the pipe-connections which supply it with steam.

In Figs. 7 and 8 I illustrate the preferred form of my invention, in which I employ a number of removable plates or sections 1 in lieu of the chamber W, which I heretofore used, the said plates or sections being provided with flanges 2 of the same shape as the flanges $w$. The said plates are of varying widths, and are each provided with a tube X. In order to space the said detachable plates or sections to any desired distance apart, I employ space-blocks 3, such as illustrated in Fig. 8 and in dotted lines in Fig. 7, said space-blocks being adapted to be inserted between the said plates or sections. When the said plates or sections are employed, it will be necessary to remove some of the plunger-rods M′, which may be readily done by first removing the nuts N′ thereof, and the plunger-rods must be adjusted laterally to the required distance, which may be done by sliding them in the slot $p$ of the cross-head.

Having thus described my invention, I claim—

1. In a machine for molding semi-fluid material, the combination, with the hopper and the cross-head, of the shaft T, having the crank-wheels U, the yokes $u$, provided with crank-pins $u^7$ and having arms $u'$ at their ends extending over the peripheries of said wheels, adjusting-screws $u^6$ through said arms bearing upon said peripheries, clamping-bolts $a^4$, extending from the outer face of each wheel through slots in said yokes, and pitmen $v$, connecting the cross-head with the crank-pins of the yokes, substantially as described.

2. The combination, in a confection-molding machine or the like, of the tube X, the plunger I′ therein, having the shoulder $c'$ at its upper end and the valve-seat L′ in its lower end, the plunger-rod M′, having the valve P′ at the lower end thereof and the threaded stem O′ at the upper end, the length of the stem being somewhat in excess of the length of the plunger I′, for the purpose set forth, and the sleeve $b$, screwed around the said stem O′, operating within a limited space in the plunger, and having the shoulder $b'$ to engage the shoulder $c'$, substantially as specified.

3. The combination, in a confection-molding machine or the like, of the hopper having the tube X, the removable valve-cup Z at the lower end of said tube, the plunger I′ in said tube, having the interior shoulder $c'$ at its upper end and the valve-seat L′ in its lower end, the plunger-rod M′, having the valve P′ at the lower end thereof and the threaded stem O′ at the upper end, and the sleeve $b$, moving vertically in the plunger I′ and screwed to the said plunger-rod and having the shoulder $b'$ to engage the shoulder $c'$, substantially as described.

4. The combination, in a confection-molding machine or the like, of the hopper having the longitudinally-adjustable discharge-tubes X, carried by the bottom, the reciprocating cross-head having the slots $p$, the plungers I′ in the tubes X, for the purpose set forth, and the plunger-rods M′, having their upper ends extending through and adjustable in the slots $p$, substantially as described.

5. In a confection-molding machine or the like, the combination, with the hopper having the opening in its lower side and the downward-converging flanges $m^2$, of the plates 1, having the tubes X and the flanges 2 to engage the flanges $m^2$, and the space-blocks 3, adapted to be inserted between the said plates, for the purpose set forth, substantially as described.

6. In a confection-molding machine or the like, the combination, with the hopper having the opening in its lower side and the downward-converging flange $m^2$, of the plates 1, having the tubes X and the flanges 2 to engage the flanges $m^2$, substantially as described.

In testimony that I claim the foregoing as my own I have hereto affixed my signature in presence of two witnesses.

JOSHUA CLAY RUBY.

Witnesses:
E. G. SIGGERS,
WM. J. SHETTSLINE.